US012696162B2

(12) United States Patent
Wu et al.

(10) Patent No.: US 12,696,162 B2
(45) Date of Patent: Jul. 28, 2026

(54) METHOD AND APPARATUS FOR CONDITIONAL REESTABLISHMENT AND CONSECUTIVE REESTABLISHMENT

(71) Applicant: Lenovo (Beijing) Limited, Beijing (CN)

(72) Inventors: Lianhai Wu, Beijing (CN); Jie Shi, Beijing (CN); Zhi Yan, Beijing (CN); Jing Han, Beijing (CN); Min Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 576 days.

(21) Appl. No.: 18/006,696

(22) PCT Filed: Jul. 24, 2020

(86) PCT No.: PCT/CN2020/104469
§ 371 (c)(1),
(2) Date: Jan. 24, 2023

(87) PCT Pub. No.: WO2022/016513
PCT Pub. Date: Jan. 27, 2022

(65) Prior Publication Data
US 2023/0276333 A1    Aug. 31, 2023

(51) Int. Cl.
*H04W 4/00*        (2018.01)
*H04W 36/00*      (2009.01)
(Continued)

(52) U.S. Cl.
CPC ... *H04W 36/305* (2018.08); *H04W 36/00835* (2018.08); *H04W 36/304* (2023.05); *H04W 76/19* (2018.02); *H04W 36/326* (2023.05)

(58) Field of Classification Search
None
See application file for complete search history.

(56) References Cited

U.S. PATENT DOCUMENTS

| 11,997,550 B2 * | 5/2024 | Kim | ............... H04W 36/0079 |
| 2015/0189571 A1 * | 7/2015 | Futaki | ............... H04W 24/10 |
| | | | 370/331 |

(Continued)

FOREIGN PATENT DOCUMENTS

| CN | 104349403 A | 2/2015 |
| WO | 2020065126 A2 | 4/2020 |

(Continued)

OTHER PUBLICATIONS

ETSI MCC. "Report of 3GPP TSG RAN2#101 meeting, Athens, Greece" 3GPP TSG-RAN WG2 meeting #101, R2-1804201, Apr. 20, 2018; pp. 1-250.

(Continued)

*Primary Examiner* — Bob A Phunkulh
(74) *Attorney, Agent, or Firm* — AMPACC Law Group, PLLC

(57)        ABSTRACT

Embodiments of the present disclosure relates to methods and apparatuses for conditional reestablishment and consecutive reestablishment. According to some embodiments of the present disclosure, a method includes: receiving, at a user equipment (UE), conditional reestablishment configuration information indicating a set of execution conditions for a set of candidate cells, wherein each candidate cell of the set of candidate cells is associated with at least one execution condition; and evaluating the set of execution conditions based on the conditional reestablishment configuration information. The UE may autonomously perform a reestablishment procedure in response to the condition is met. In addition, the UE can perform consecutive reestablishment based on the configuration.

19 Claims, 8 Drawing Sheets

(51) Int. Cl.
*H04W 36/30*      (2009.01)
*H04W 76/19*      (2018.01)
*H04W 36/32*      (2009.01)

(56)                References Cited

U.S. PATENT DOCUMENTS

| | | | |
|---|---|---|---|
| 2019/0037420 A1* | 1/2019 | Fujishiro ............... | H04W 24/02 |
| 2020/0022043 A1* | 1/2020 | Pelletier ................ | H04W 36/04 |
| 2020/0260342 A1* | 8/2020 | Vaidya ................ | H04W 36/362 |
| 2020/0396652 A1* | 12/2020 | Decarreau ......... | H04W 36/0033 |
| 2021/0168678 A1* | 6/2021 | Deenoo .............. | H04W 36/305 |
| 2021/0235340 A1* | 7/2021 | Moosavi .......... | H04W 36/0094 |
| 2021/0235341 A1* | 7/2021 | Decarreau ....... | H04W 36/00838 |
| 2021/0377830 A1* | 12/2021 | Jin ................... | H04W 36/0058 |
| 2022/0030483 A1* | 1/2022 | Cheng ............. | H04W 36/00838 |
| 2022/0030485 A1* | 1/2022 | Kim ...................... | H04W 76/30 |
| 2022/0038976 A1* | 2/2022 | Hwang .............. | H04W 36/362 |
| 2022/0191752 A1* | 6/2022 | Rune .............. | H04W 36/00837 |
| 2022/0201561 A1* | 6/2022 | Bin Redhwan ... | H04W 36/0072 |
| 2022/0303847 A1* | 9/2022 | Wu ....................... | H04W 76/18 |

FOREIGN PATENT DOCUMENTS

| | | | |
|---|---|---|---|
| WO | 2020112011 A1 | 6/2020 | |
| WO | 2020122509 A1 | 6/2020 | |

OTHER PUBLICATIONS

International Search Report and Written Opinion dated Apr. 22, 2021 for International Application No. PCT/CN2020/104469.

* cited by examiner

200

230

220

210

600 initiating a reestablishment procedure ⸺ 611 selecting a target cell ⸺ 613 transmitting a reestablishment request message ⸺ 615

METHOD AND APPARATUS FOR CONDITIONAL REESTABLISHMENT AND CONSECUTIVE REESTABLISHMENT

CROSS-REFERENCE TO RELATED APPLICATIONS

The present specification is a U.S. National Stage of International Patent Application No. PCT/CN2020/104469 filed Jul. 24, 2020, the entire contents of which is incorporated herein by reference.

TECHNICAL FIELD

Embodiments of the present disclosure generally relate to wireless communication technology, especially to conditional reestablishment and consecutive reestablishment in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

A communication link can be established in a wireless communication system to provide service(s) (e.g., voice, data, or other(s)) to a user equipment (UE). However, the communication link may fail due to various factors. When a link failure is detected, the UE can request communication link reestablishment, either the previous communication link or a new communication link. The method of reestablishing the communication link can include, for example, performing a reestablishment procedure with a base station (BS), to maintain continuity of the service(s).

However, the reestablishment procedure(s) on the market now can be time-consuming and may cause latency in the wireless communication system. The industry desires a technology for reducing reestablishment latency and guaranteeing service continuity.

SUMMARY

An embodiment of the present disclosure provides a method. The method may include: receiving, at a user equipment (UE), conditional reestablishment configuration information indicating a set of execution conditions for a set of candidate cells, wherein each candidate cell of the set of candidate cells is associated with at least one execution condition; and evaluating the set of execution conditions based on the conditional reestablishment configuration information.

Another embodiment of the present disclosure provides a method. The method may include transmitting, to a user equipment (UE), conditional reestablishment configuration information indicating a set of execution conditions for a set of candidate cells, wherein each candidate cell of the set of candidate cells is associated with at least one execution condition.

Another embodiment of the present application provides an apparatus. The apparatus includes: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any of the above-mentioned methods.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE), and so on. It is contemplated that along with the developments of network architectures and new service scenarios, all embodiments in the present disclosure are also applicable to similar technical problems;

and moreover, the terminologies recited in the present disclosure may change, which should not affect the principle of the present disclosure.

Figure 1:
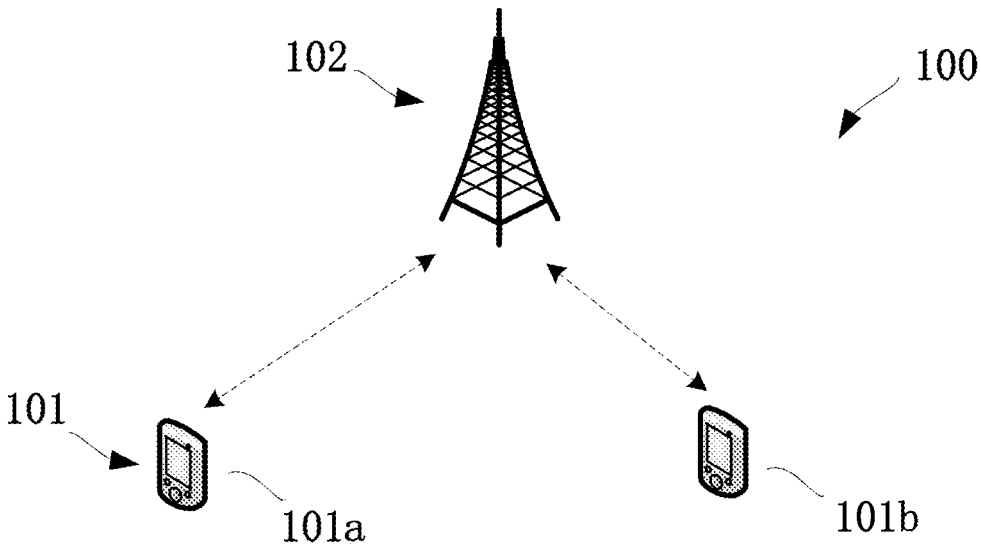
FIG. 1 is a schematic diagram illustrating an exemplary wireless communication system according to some embodiments of the present disclosure.

FIG. 1 is a schematic diagram illustrating an exemplary wireless communication system 100 according to some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs 101 and BSs 102 may be included in the wireless communication system 100.

The UE(s) 101 may be any type of device configured to operate and/or communicate in a wireless environment. For example, a UE 110 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, internet-of-things (IoT) devices, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with BSs 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102. The BS 102 may communicate with UE(s) 101 via downlink (DL) communication signals.

The BS 220 may be configured to transmit and/or receive wireless signals within a particular geographic region, which may be referred to as a cell (not shown in FIG. 1). In some cases, the geographic region for a base station may be divided into sectors, each making up a portion of the geographic region. The term "cell" may refer to a portion of the geographic region (e.g., a sector).

The BS 102 may be in communication with a core network (not shown in FIG. 1). The core network (CN) may include a plurality of core network components, such as a mobility management entity (MME) (not shown in FIG. 1) or an access and mobility management function (AMF) (not shown in FIG. 1). The CNs may serve as a gateway for the UEs to access a public switched telephone network (PSTN) and/or other networks (not shown in FIG. 1).

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

To extend the coverage and availability of wireless communication systems (e.g., 5G systems), spaceborne vehicles and airborne vehicles may be utilized in communications related to ground devices such as user equipment (UE). Network or segment of network using a spaceborne or airborne vehicle may be referred to as a non-terrestrial network (NTN). A spaceborne vehicle may include a satellite, such as low earth orbiting (LEO) satellite, medium earth orbiting (MEO) satellite, geostationary earth orbiting (GEO) satellite, and highly elliptical orbiting (HEO) satellite. An airborne vehicle may include high altitude platform (HAP) encompassing unmanned aircraft system (UAS). A UAS may include lighter than air UAS (LTA) and heavier than air UAS (HTA), which may operate in altitudes such as between 8 and 50 km and may be quasi-stationary. In a NTN, some or all functions of a base station (BS) may be deployed in a satellite or an airborne vehicle.

Figure 2:
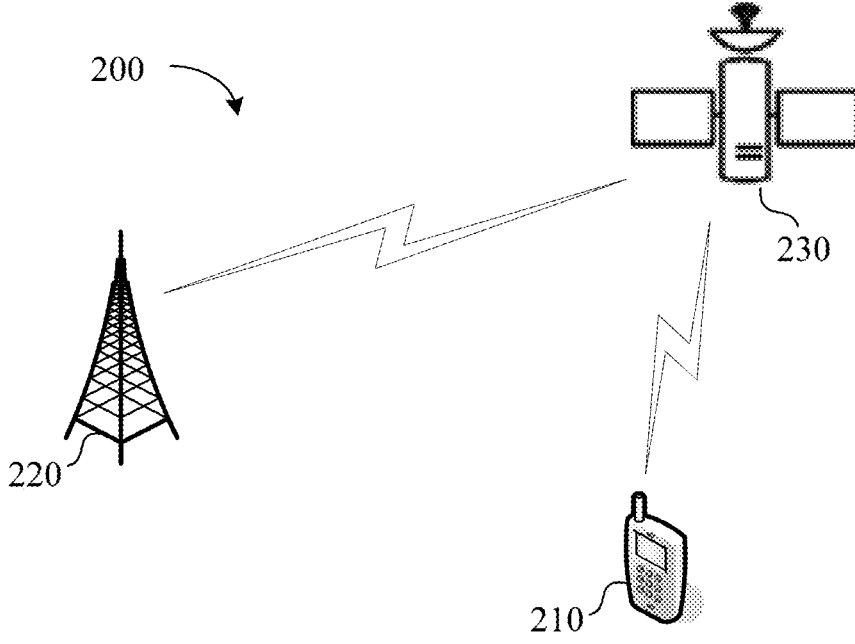
FIG. 2 is a schematic diagram illustrating an exemplary wireless communication system according to some embodiments of the present disclosure.

FIG. 2 is a schematic diagram illustrating an exemplary wireless communication system 200 according to some embodiments of the present disclosure.

As shown in FIG. 2, a wireless communication system 200 may include one or more UEs (e.g., UE 210), one or more BSs (e.g., BS 220), one or more radio access networks (RANs) (e.g., RAN 221), and one or more satellites (e.g., satellite 230). It is contemplated that the wireless communication system 200 may include any number of UEs, BSs, satellites, networks, and/or network components.

The UE 210 may function as the UE 101a or UE 101b shown in FIG. 1 and the BS 220 may function as the BS 102 shown in FIG. 1. Some or all functions of a base station may be deployed in satellite 230. In some cases, a satellite 230 may be also referred to as a base station.

Referring to FIG. 2, the satellite 230 may be in communication with the BS 220 and the UE 210. In some examples, the BS 220 may utilize the satellite 230 to relay communications to the UE 210. In some examples, the UE 210 may be connected to a core network (not shown in FIG. 1) via the satellite 130. The concept of cell with respect to a BS may similarly apply to a satellite. For example, a satellite may generate beams over a certain service area, which may be referred to as a cell.

Although an NTN application scenario is depicted in FIG. 2, it is contemplated that a NTN may be applied in other different scenarios and may have structure different from the structure as illustrated in FIG. 2.

Narrowband (NB) IoT (NB-IoT) is a radio access technology that can provide connection to network services by physical layer optimized for very low power consumption (e.g., full carrier bandwidth can be 180 kHz, subcarrier spacing can be 3.75 kHz or 15 kHz).

NB-IoT radio access technology is introduced in 3GPP release 13 to provide internet-of-things (IoT) services to massive numbers of devices using narrow system bandwidth (e.g., as narrow as 200 kHz). 3GPP release 14 adds enhancements in the form of support for higher data rates, multicast, positioning, a lower power UE class, and system access on non-anchor carriers. 3GPP release 15 introduces further enhancements in the form of support for improved latency, power consumption, measurement accuracy, cell range, and load control. To extend the range of deployment options, 3GPP release 15 also specifies small cell and time division duplexing (TDD) support for NB-IoT.

NB-IoT is a fast-growing wireless technology and has been a commercial success. The number of deployed networks and the volume of connected devices are undergoing a steady growth. To support this growth, in 3GPP release 16, NB-IoT is enhanced to further improve the network operation and efficiency in a range of areas. In some examples, a number of E-UTRA protocol functions supported by release 8 UEs may not be used for NB-IoT, and thus need not be supported by BSs and UEs only using NB-IoT.

Figure 3:
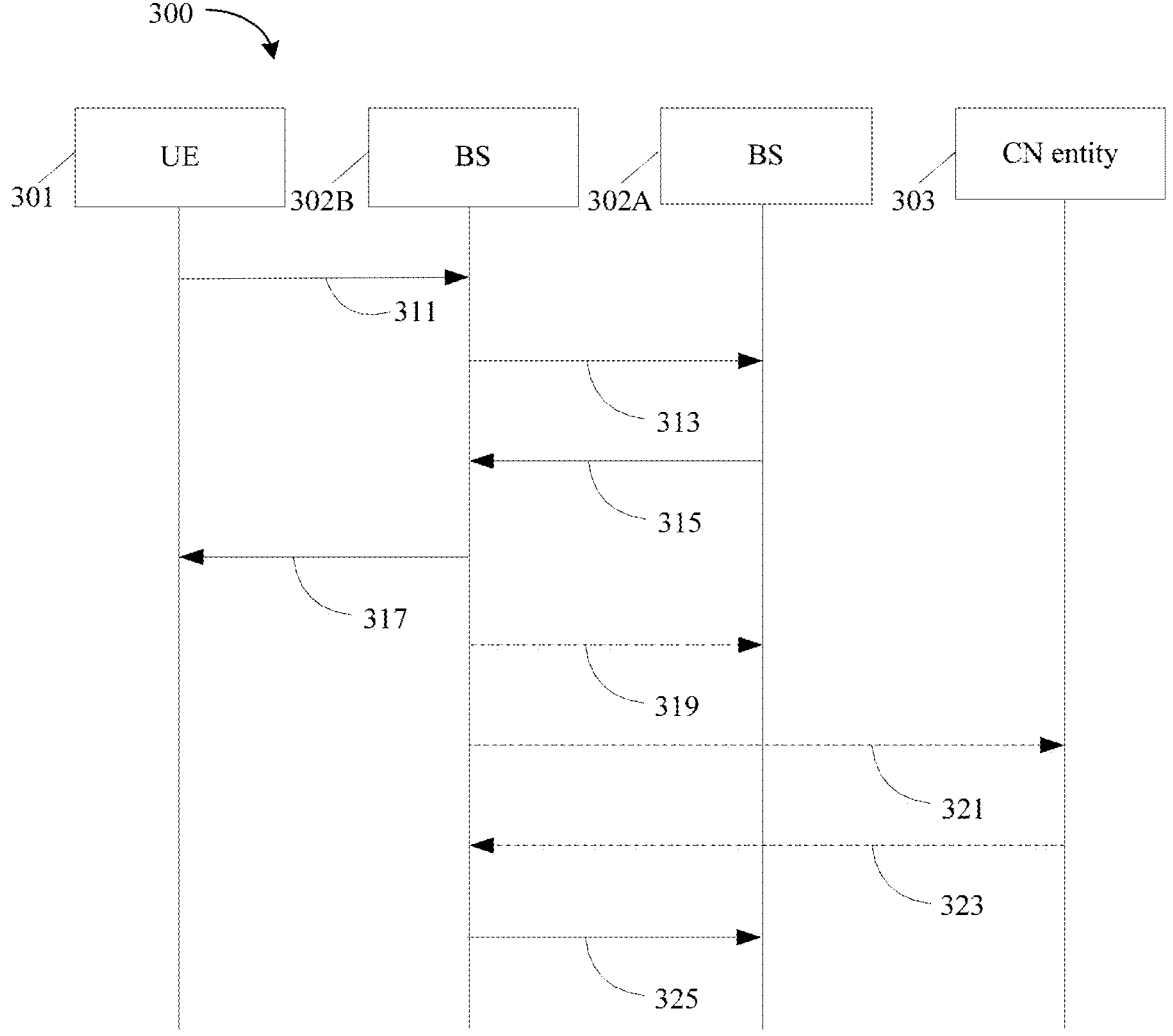
FIG. 3 illustrates a flow chart of an exemplary reestablishment procedure according to some embodiments of the present disclosure.

FIG. 3 illustrates a flow chart of an exemplary reestablishment procedure 300 according to some embodiments of the present disclosure. Details described in all of the foregoing embodiments of the present disclosure are applicable for the embodiments shown in FIG. 3.

The procedure in FIG. 3 may occur, for example, in response to a radio link failure (RLF) on a radio link between UE 301 and BS 302A (i.e., source BS). The UE 301 may select a target BS (e.g., BS 302B) to reestablish the radio link. The BS 302A and the BS 302B may operate or work under the control of a CN entity (e.g., CN entity 303). The UE 301 may function as the UE 101a or UE 101b shown in FIG. 1, or UE 210 shown in FIG. 2. The BS 302A and BS 302B may function as the BS 102 shown in FIG. 1, or BS 220 or satellite 230 shown in FIG. 2. The CN entity 303 may be a MME or AMF.

In operation 311, the UE 301 may transmit a radio resource control (RRC) reestablishment request message to the BS 302B. The RRC reestablishment request message may include information that can identify UE 301, such as the Physical Cell ID (PCI) of the BS 302A and the Cell Radio Network Temporary Identifier (C-RNTI) identifying the UE 301 at the BS 302A. The UE 301 may start a timer (e.g., T301) associated with the reestablishment request message in response to the transmission of the RRC reestablishment request message.

The BS 302B may try to identify the source BS of the UE 301 based on the PCI. In the case that the BS 302B identifies the source BS (e.g., BS 302A) of the UE 301, the BS 302B may transmit, in operation 313, a request to the BS 302A to retrieve the UE context of the UE 301 if the UE context is not available at the BS 302B. The request may be transmitted in a retrieve UE context request message. The retrieve UE context request message may include the PCI of the BS 302A, the C-RNTI of the UE 301, and an evolved universal terrestrial radio access network (E-UTRAN) cell identifier of the BS 302B.

In the case that the BS 302A matches the UE context with the PCI and the E-UTRAN cell identifier in the retrieve UE context request message, the BS 302A may transmit, in operation 315, a retrieve UE context response message to the BS 302B. The retrieve UE context response message may include the UE context of the UE 301.

In some embodiments of the present disclosure, operations 313 and 315 may be omitted if the UE context of the UE 301 is available at the BS 302B. For example, the BS 302B and the BS 302A may be the same BS, and the UE 301 may try to access different or the same cell of the same BS. In this example, the UE context of the UE 301 is available at the target BS, and thus operations 313 and 315 are omitted.

In operation 317, the BS 302B may transmit a RRC reestablishment message to the UE 301. The UE 301 may stop the timer (e.g., T301) associated with the RRC reestablishment request message in response to the RRC reestablishment message. In operation 325, the BS 302B may transmit a UE context release message to the BS 302A to trigger the release of the UE resources associated with the UE 301 at the BS 302A.

In some embodiments of the present disclosure, the procedure 300 may further include operation 319 (denoted by dotted arrow as an option). In operation 319, the BS 302B may provide a forwarding address to the BS 302A. The BS 302A may transmit the downlink user data buffered in the BS 302A to the forwarding address to prevent loss of data.

In some embodiments of the present disclosure, the procedure 300 may further include operations 321 and 323 (denoted by dotted arrow as an option). In operation 321, the BS 302B may transmit a path switch request message to the CN entity 303. In operation 323, the CN entity 303 may transmit a path switch request response message to the BS 302B. In operation 325, the BS 302B may transmit a UE context release message to the BS 302A to trigger the release of the UE resources associated with the UE 301 at the BS 302A.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
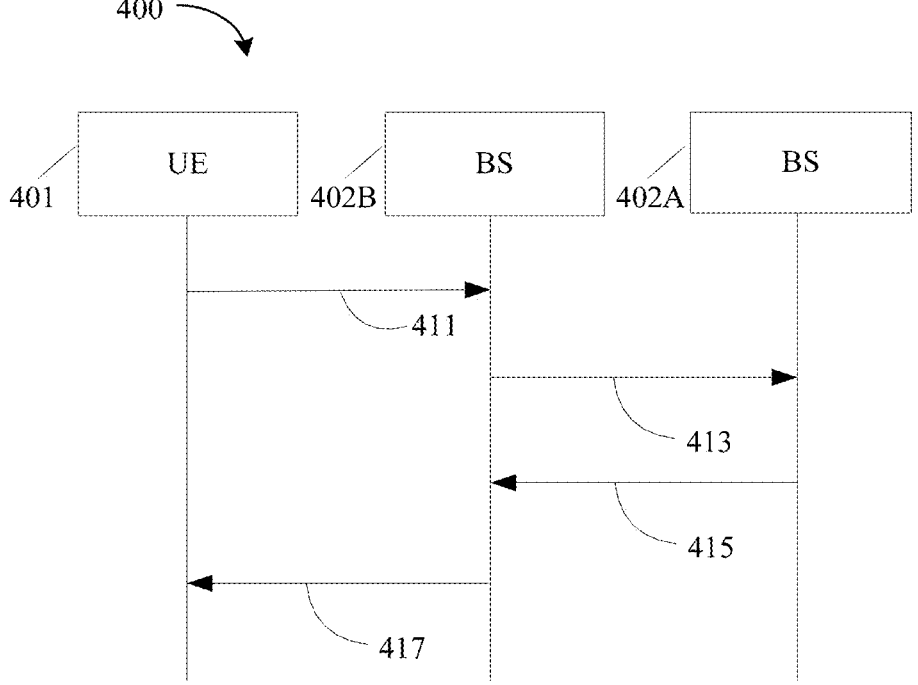
FIG. 4 illustrates a flow chart of an exemplary reestablishment procedure according to some embodiments of the present disclosure.

FIG. 4 illustrates a flow chart of an exemplary reestablishment procedure 400 according to some embodiments of the present disclosure. Details described in all of the foregoing embodiments of the present disclosure are applicable for the embodiments shown in FIG. 4.

Similarly to the reestablishment procedure 300 in FIG. 3, the procedure 400 may occur, for example, in response to a RLF on a radio link between UE 401 and BS 402A (i.e., source BS). The UE 401 may select a target BS (e.g., BS 402B) to reestablish the radio link. The UE 401 may function as the UE 101a or UE 101b shown in FIG. 1, or UE 210 shown in FIG. 2. The BS 402A and BS 402B may function as the BS 102 shown in FIG. 1, or BS 220 or satellite 240 shown in FIG. 2.

Operations 411 and 413 in reestablishment procedure 400 correspond to operations 311 and 313 in reestablishment procedure 400 in FIG. 3. For example, in operation 411, the UE 401 may transmit a RRC reestablishment request message to the BS 402B. The UE 401 may start a timer (e.g., T301) associated with the RRC reestablishment request message in response to the transmission of the RRC rees-tablishment request message. In operation 413, the BS 402B may transmit a request to the BS 402A to retrieve the UE context of the UE 401 if the UE context is not available at the BS 402B.

The BS 402A may fail to find the UE context of the UE 401 based on the C-RNTI, PCI, and E-UTRAN cell identi-fier. In this case, the BS 402A may transmit, in operation 415, a retrieve UE context failure message to the BS 402B. The BS 402B may fail to the RRC connection resume procedure or reestablishment procedure. In operation 417, the BS 402B may transmit a RRC reestablishment failure message to the UE 401. The UE 401 may stop the timer (e.g., T301) associated with the RRC reestablishment request message in response to the RRC reestablishment failure message.

It should be appreciated by persons skilled in the art that the sequence of the operations in exemplary procedure 400 may be changed and some of the operations in exemplary procedure 400 may be eliminated or modified, without departing from the spirit and scope of the disclosure.

It should also be appreciated by persons skilled in the art that the above reestablishment procedure as described above or as will be described below can be applied to various communication systems including, but not limited to, NR systems, NB-IoT systems, and NTN systems (e.g., wireless communication system 200).

A radio link can be established in the above-mentioned wireless communication systems to provide service(s) (e.g., voice, data, or other(s)) to a UE. However, the radio link may fail due to various factors. When a link failure is detected, the UE can request radio link reestablishment. However, the reestablishment procedure can be time-con-suming and may cause latency in a wireless communication system. To reduce reestablishment latency, embodiments of the present disclosure propose a conditional reestablishment procedure, which may be triggered before a radio link failure (RLF) happens. More details on the embodiments of the present disclosure will be illustrated in the following text in combination with the appended drawings.

Figure 5:
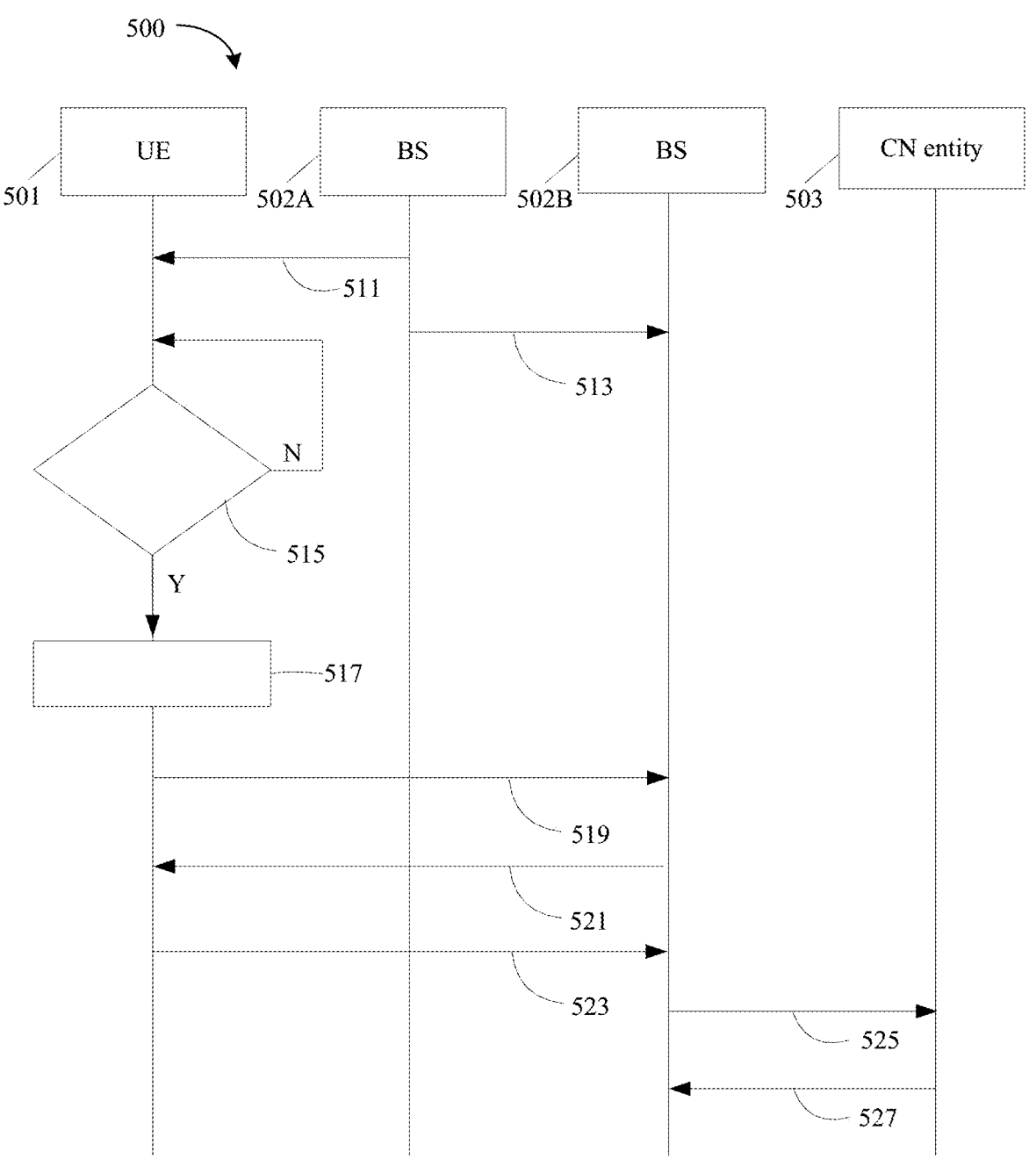
FIG. 5 illustrates a flow chart of an exemplary reestablishment procedure according to some embodiments of the present disclosure.

FIG. 5 illustrates a flow chart of an exemplary conditional reestablishment procedure 500 according to some embodi-ments of the present disclosure.

UE 501 may function as the UE 101a or UE 101b shown in FIG. 1, or UE 210 shown in FIG. 2. BS 502A and BS 502B may function as the BS 102 shown in FIG. 1, or BS 220 or satellite 230 shown in FIG. 2. CN entity 503 may be a MME or AMF. Details described in all of the foregoing embodiments of the present disclosure are applicable for the embodiments shown in FIG. 5.

Referring to FIG. 5, the UE 501 may access the BS 502A (i.e., serving BS or source BS). The BS 502A may determine to apply a conditional reestablishment for the UE 501. In operation 511, the BS 502A may transmit conditional rees-tablishment configuration information to the UE 501. The conditional reestablishment configuration information may indicate a set of execution conditions for a set of candidate cells, wherein each candidate cell of the set of candidate cells may be associated with at least one execution condi-tion. The set of candidate cells may include at least one cell of at least one potential target BS.

For example, the conditional reestablishment configura-tion information may indicate a candidate cell A and a candidate cell B, and at least one execution condition for each of the candidate cell A and candidate cell B. The execution conditions for the candidate cell A and candidate cell B may be the same or different. The candidate cell A and candidate cell B may from the same or different BS.

In some embodiments of the present disclosure, the execution condition may be a measurement-based condition (hereinafter, execution condition #1). For example, the execution condition may be a condition event (hereinafter, referred to as "A3 event") that a conditional reestablishment candidate cell is an offset better than the serving cell (e.g., primary cell (PCell)) of the UE. In other words, a channel quality between the UE and a candidate cell is better than a channel quality between the UE and the serving cell of the UE and the difference between the channel quality between the UE and the candidate cell and the channel quality between the UE and the serving cell of the UE is greater than the offset.

In another example, the execution condition may be a condition event (hereinafter, referred to as "A5 event") that the serving cell (e.g., primary cell (PCell)) of the UE becomes worse than threshold #1 and a conditional reestab-lishment candidate cell becomes better than threshold #2. In other words, a channel quality between the UE and the serving cell of the UE is less than threshold #1, and a channel quality between the UE and the candidate cell is greater than threshold #2.

In yet another example, the execution condition may be a combination of A3 event and A5 event. In other words, the difference between a channel quality between the UE and the candidate cell and a channel quality between the UE and the serving cell of the UE is greater than an offset, a channel quality between the UE and the serving cell of the UE is less than threshold #1, and a channel quality between the UE and the candidate cell is greater than threshold #2.

In some embodiments of the present disclosure, the execution condition may be a distance-based (or location-based) trigger condition (hereinafter, execution condition #2). The distance-based trigger condition may be repre-sented as the distance between a UE and the source/serving cell (or BS) or the distance between a UE and a potential target cell (or BS). For example, the execution condition may be a conditional event that a distance between the UE and the serving cell of the UE is greater than threshold #3 and a distance between the UE and a conditional reestab-lishment candidate cell is less than threshold #4.

In some embodiments of the present disclosure, the execution condition may be a time-based condition (here-inafter, execution condition #3). For example, the execution condition may indicate an absolute time for performing conditional reestablishment. When the time reaches the configured absolute time (e.g., 8 AM), the execution con-dition is fulfilled.

In some embodiments of the present disclosure, the execution condition may be a timer-based condition (here-inafter, execution condition #4). For example, the execution condition may indicate a value of a timer. The timer may start in response to the start of the physical layer problem timer (e.g., T310). For example, the timer may start as the timer T310 starts. The execution condition is fulfilled in response to the expiry of the timer.

In some embodiments of the present disclosure, the execution condition may be a timing advance value based trigger condition (hereinafter, execution condition #5). For example, the execution condition may be a conditional event that the timing advance value from the UE to a candidate cell is less than threshold #5. In another example, the execution condition may be a conditional event that the timing advance value from the UE to a candidate cell is less than threshold

6, and the timing advance value from the UE to the serving cell of the UE is greater than threshold #7.

In some embodiments of the present disclosure, the execution condition may be an elevation angle based trigger condition (hereinafter, execution condition #6). For example, the execution condition may be a conditional event that the elevation angle of the serving cell (or BS) of the UE is less than threshold #8, and the elevation angle of a corresponding candidate cell (or BS) is greater than threshold #9. The elevation angle may be represented as the angle between the horizontal plane and the line between a cell and a UE, measured in the vertical plane.

The above mentioned parameters such as thresholds, timer, and timer value may be configured by a BS or predefined, for example, in standards.

In some embodiments of the present disclosure, execution condition #1, #2, #5 or #6 is considered as being fulfilled when execution condition #1, #2, #5 or #6 is satisfied during a timer to trigger (TTT) period. For example, during a TTT period, when a UE is configured with execution condition #2, the UE may determine that the distance between the UE and the serving cell of the UE is greater than threshold #3 and the distance between the UE and a conditional reestablishment candidate cell is less than threshold #4. In this case, the UE may consider that execution condition #2 is fulfilled.

In some embodiments of the present disclosure, the set of candidate cells may include a candidate cell associated with at least two execution conditions. In some instances, this candidate cell satisfies a reestablishment condition when all of the at least two execution conditions associated with the candidate cell is fulfilled. In some another instances, this candidate cell satisfies a reestablishment condition when one of the at least two execution conditions associated with the candidate cell is fulfilled. In some embodiments of the present disclosure, the set of candidate cells may include a candidate cell associated with one execution condition. This candidate cell satisfies a reestablishment condition when the associated execution condition is fulfilled. The set of candidate cells may include a candidate cell associated with at least two execution conditions.

In some embodiments of the present disclosure, the UE 501 may transmit its capability information to the BS 502A. The capability information may indicate at least one execution condition supported by the UE 501. In some examples, the UE capability information may indicate at least one of execution condition #1 to execution condition #6. For example, the UE capability information may indicate that the UE supports at least one of: measurement-based condition, distance-based condition, time-based condition, timer-based condition, timing advance-based condition, and elevation angle-based condition. An information element (IE) may be used to indicate whether a certain execution condition is supported or not by the UE. For instance, an IE may be used to indicate whether execution condition #1 is supported or not.

In some embodiments of the present disclosure, the BS 502A may determine the conditional reestablishment configuration information based on the capability information if the UE 501. For example, when the capability information indicates that the UE 501 does not support execution condition #1, the BS 502A may not include execution condition #1 in the set of execution conditions.

In some embodiments of the present disclosure, the conditional reestablishment configuration information may be received in a radio resource control (RRC) message. In some examples, a BS may use one RRC message to configure, modify or remove one or more reestablishment candidate cells.

Still referring to FIG. 5, in operation 513, the BS 502A may transmit a message including the UE context of the UE 501 to at least one candidate cell (e.g., BS 502B) of the set of candidate cells. The UE context may be transmitted to some or all of the candidate cells in the set of candidate cells. In some examples, the transmission of the UE context may occur in response to the transmission of the conditional reestablishment configuration information. In some other examples, the transmission of the UE context may occur prior to the transmission of the conditional reestablishment configuration information.

In some embodiments of the present disclosure, the message may further indicate a value of a timer associated with the validity period of the UE context. In response to receiving the message, BS 502B may store the UE context of the UE 501 and may start the timer associated with the validity period of the UE context. BS 502B may release the UE context of the UE 501 in response to the expiry of the timer.

In operation 515, the UE 501 may evaluate the set of execution conditions based on the conditional reestablishment configuration information. For example, for each candidate cell, the UE may evaluate whether the associated condition(s) is fulfilled or not, and may determine whether a corresponding candidate cell satisfies a reestablishment condition based on the evaluation.

For example, assuming that a candidate cell A is associated with execution condition #2, the UE 501 may measure the distance (distance #1) between the UE 501 and its serving cell and the distance (distance #2) between the UE 501 and the candidate cell A. The UE 501 may determine that candidate cell A satisfies a reestablishment condition when distance #1 is greater than threshold #3 and whether distance #2 is less than threshold #4.

In some embodiments of the present application, in response to a candidate cell satisfying a reestablishment condition, the UE 501 may initiate a conditional reestablishment procedure. In response to the initiation of the conditional reestablishment procedure, a timer (e.g., T311) associated with reestablishment initiation may not be started. In other words, a UE may not start the timer T311 when the UE initiates a reestablishment procedure because the reestablishment condition is satisfied. Or to put it yet another way, a UE may not start the timer T311 when the UE initiates the reestablishment procedure to perform a conditional reestablishment.

In some embodiments of the present application, more than one candidate cell may satisfy the reestablishment condition. That is, more than one candidate cell is suitable for the UE's conditional reestablishment. In this case, in operation 517, the UE 501 may select a target cell from the more than one candidate cell for performing conditional reestablishment.

In some embodiments of the present application, the UE may select a candidate cell with the greatest number of associated execution condition being fulfilled as the target cell. For example, both candidate cell A and candidate cell B may satisfy the reestablishment condition. Candidate cell A is associated with three execution conditions, all of which are fulfilled. Candidate cell B is associated with two execution conditions, all of which are fulfilled. In this case, the UE may select candidate cell A since the number ("3") of fulfilled execution conditions of candidate cell A is larger than that ("2") of candidate cell B. In another example, one of the three execution conditions associated with candidate cell A may be fulfilled and all of the two execution conditions associated with candidate cell B may be fulfilled. In this case, the UE may select candidate cell B.

In some embodiments of the present application, the UE may select the target cell from the more than one candidate cell based on the channel quality. For example, the channel quality between the UE and the target cell is the best one among the channel qualities between the UE and the more than one candidate cell.

In some embodiments of the present application, it is UE's implementation to select the target cell. For example, the UE may select the target cell from the more than one candidate cell randomly, or based on any other suitable criteria.

Still referring to FIG. 5, assuming that the UE 501 may select BS 502B as the target cell, in operation 519, the UE 501 may transmit a reestablishment request message to the BS 502B. The UE 501 may start a timer (e.g., T301) associated with the reestablishment request message in response to the transmission of the reestablishment request message.

In response to the reestablishment request message, the BS 502B may transmit a reestablishment message to the UE 501 in operation 521. The UE 501 may stop the timer (e.g., T301) associated with the reestablishment request message in response to the reestablishment message.

In operation 523, the UE 501 may transmit a reestablishment complete message to the BS 502B. In the case that the BS 502B determines that the UE context of the UE 501 is not locally available, the BS 502B may transmit a retrieve UE context request message to the BS 502A, as described above with respect to FIG. 3. In operations 525 and 527, the BS 502B may perform a path switch procedure with a CN entity 503 (e.g. MME or AMF), as described above with respect to FIG. 3.

Although a successful conditional reestablishment procedure is shown in FIG. 5, it is contemplated that the conditional reestablishment procedure may fail as described above with respect to FIG. 4.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
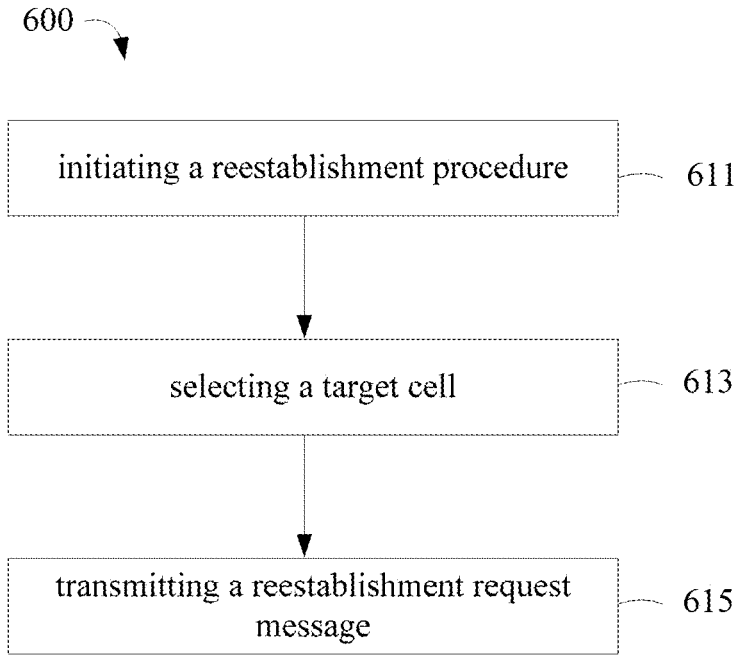
FIG. 6 illustrates a flow chart of an exemplary reestablishment procedure according to some embodiments of the present disclosure.

FIG. 6 illustrates a flow chart of an exemplary reestablishment procedure 600 according to some embodiments of the present disclosure.

A UE (e.g., the UE 101a or UE 101b shown in FIG. 1, or the UE 210 shown in FIG. 2) may perform the reestablishment procedure 600 in response to a radio link failure (RLF). Details described in all of the foregoing embodiments of the present disclosure are applicable for the embodiments shown in FIG. 6.

Referring to FIG. 6, in operation 611, the UE may initiate a reestablishment procedure in response to the RLF, for example, between the UE and its serving cell. The UE may start a timer (e.g., T311) associated with the reestablishment initiation.

In operation 613, the UE may select a target cell for performing reestablishment. The UE may stop the timer T311 in response to the selection of a target cell. For example, the UE may determine a set of suitable cells, wherein the channel quality between the UE and each cell of the set of suitable cells is better than a configured threshold. The configured threshold may be associated with S criteria, as defined in 3GPP technical specification (e.g., TS 38.304).

In some embodiments of the present disclosure, the UE may be configured with conditional reestablishment as described above. For example, the UE may receive the conditional reestablishment configuration information indicating a set of execution conditions for a set of candidate cells. In this case, the UE may determine whether the set of suitable cells includes a candidate cell(s) from the set of candidate cells. In response to the set of suitable cell including a candidate cell of the set of candidate cells, the UE may select the candidate cell as the target cell.

In operation 615, the UE may transmit a reestablishment request message to the target cell (e.g., the target BS). The UE may start a timer (e.g., T301) associated with the reestablishment request message in response to the transmission of the reestablishment request message.

After receiving the reestablishment request message, the target BS may try to retrieve the UE context of the UE. The target BS may transmit a reestablishment message (or a reestablishment failure message) to the UE in response to the reestablishment request message. The UE may transmit a reestablishment complete message to the target BS in response to the reestablishment message. The target BS may perform a path switch procedure with the CN (e.g., an MME or an AMF).

The descriptions regarding the reestablishment request message, the UE context retrieve procedure, the reestablishment message, the reestablishment failure message, the reestablishment complete message and the path switch procedure are similar to those as described above, and thus are omitted herein.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
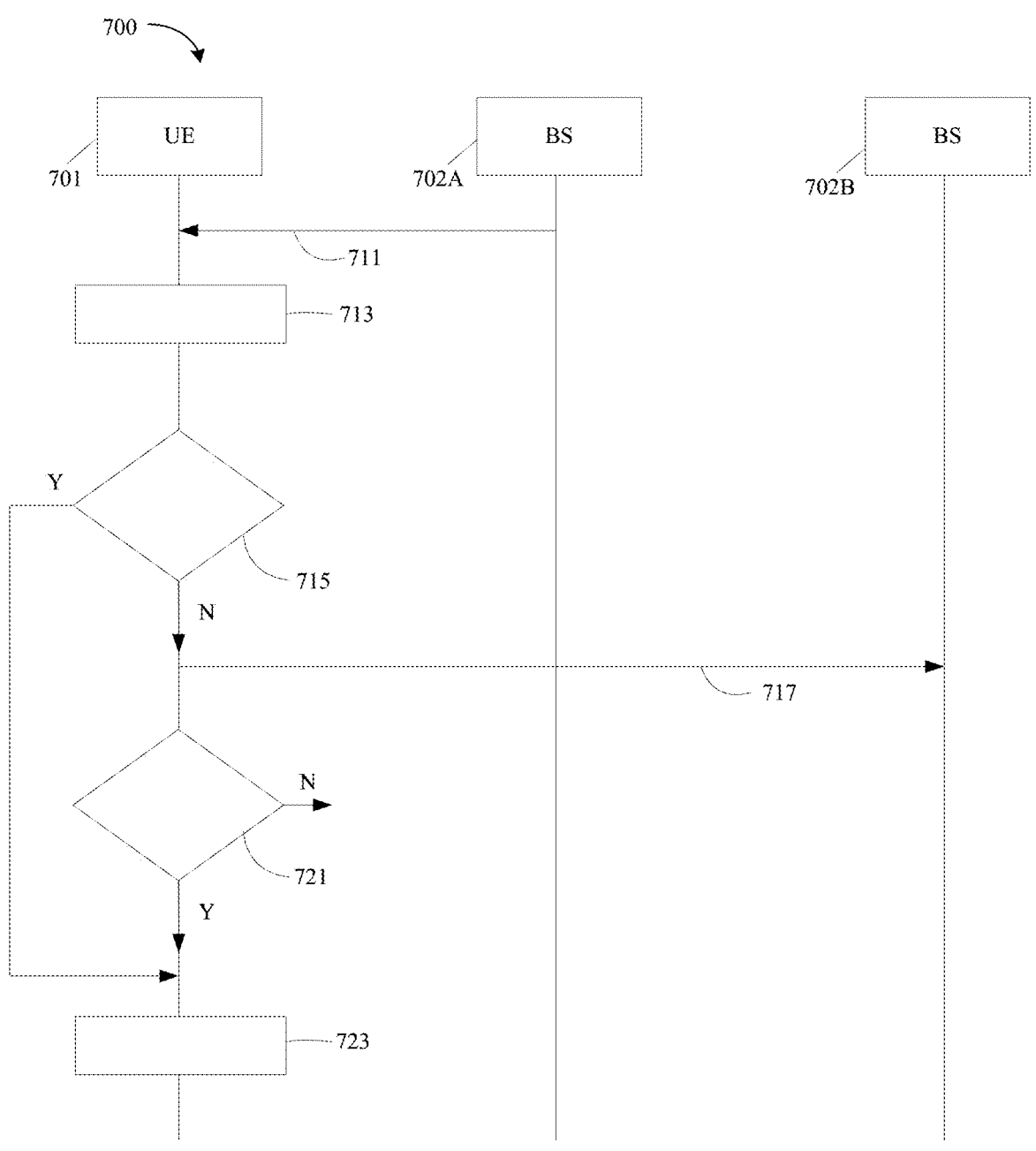
FIG. 7 illustrates a flow chart of an exemplary reestablishment procedure according to some embodiments of the present disclosure.

FIG. 7 illustrates a flow chart of an exemplary reestablishment procedure 700 according to some embodiments of the present disclosure.

UE 701 may function as the UE 101a or UE 101b shown in FIG. 1, or UE 210 shown in FIG. 2. BS 702A and BS 702B may function as the BS 102 shown in FIG. 1, or BS 220 or satellite 230 shown in FIG. 2. Details described in all of the foregoing embodiments of the present disclosure are applicable for the embodiments shown in FIG. 7.

Referring to FIG. 7, the UE 701 may access the BS 702A (i.e., serving BS or source BS). The BS 702A may determine to apply a conditional reestablishment for the UE 701. In operation 711, the BS 702A may transmit conditional reestablishment configuration information to the UE 701. The descriptions of the conditional reestablishment configuration information with respect to FIGS. 5 and 6 may apply here. For example, the conditional reestablishment configuration information may indicate a set of execution conditions for a set of candidate cells, wherein each candidate cell of the set of candidate cells may be associated with at least one execution condition. The set of candidate cells may include at least one cell of at least one potential target BS.

In some embodiments of the present disclosure, the conditional reestablishment configuration information may indicate at least one of a value of a timer for consecutive conditional reestablishment and a maximum number for consecutive conditional reestablishment. The information, i.e., the value of a timer for consecutive conditional reestablishment and the maximum number for consecutive conditional reestablishment, suggests that the UE 701 is configured with consecutive reestablishment. Accordingly, in response to one of the value of the timer for consecutive conditional reestablishment and the maximum number for consecutive conditional reestablishment being configured, the UE 701 would know that it is allowed to perform consecutive reestablishment. In other words, the UE 701 is configured with consecutive reestablishment. The UE 701 may perform consecutive reestablishment when needed.

In some embodiments of the present disclosure, in response to the maximum number for consecutive conditional reestablishment being configured, the UE 701 may initialize a counter. For example, the value of the counter may be set to "0."

In some embodiments of the present disclosure, similar to operation 513 in FIG. 5, the BS 702A may transmit a message including the UE context of the UE 701 to at least one candidate cell of the set of candidate cells (not shown in FIG. 7). The UE 701 may evaluate the set of execution conditions based on the conditional reestablishment configuration information.

In some embodiments of the present application, in operation 713, the UE 701 may detect a RLF before a conditional reestablishment procedure is initiated, and may initiate a reestablishment procedure, which may be referred to as "a normal reestablishment procedure" to distinguish it from a conditional reestablishment procedure. In response to the initiation of the reestablishment procedure, the UE 701 may start the timer (e.g., T311) associated with the reestablishment initiation. In this case, in operation 715, the UE 701 may determine whether the timer T311 expires or not. If the timer T311 expires, the procedure may go to operation 723. If the timer T311 does not expire, the procedure may go to operation 717. The UE 701 may stop the timer T311 when a target cell for reestablishment is selected.

In operation 717, the UE 701 may transmit a reestablishment request message to a target cell (e.g., BS 702B). The UE 701 may start a timer (e.g., T301) associated with the reestablishment request message in response to the transmission of the reestablishment request message. In operation 721, the UE 701 may determine whether the timer T301 expires or not. If the timer T311 does not expire, the UE 701 may wait for a response to the reestablishment request message. The UE 701 may stop the timer T311 in response to the response to the reestablishment request message. The response may be a reestablishment message or a reestablishment failure message. If the timer T301 expires or a reestablishment failure message is received, the procedure may go to operation 723.

In operation 723, the UE 701 may determine that the reestablishment procedure fails in response to, for example, the expiry of the timer T301 or timer T311 or the reestablishment failure message. In some embodiments of the present application, the UE 701 may not switch to an idle mode, and may perform a consecutive reestablishment procedure in response to the reestablishment failure when the UE 701 is configured with consecutive reestablishment.

In response to the consecutive reestablishment procedure, the UE 701 may start the timer for consecutive conditional reestablishment when the time for consecutive conditional reestablishment is configured. The UE 701 may increment the counter when the maximum number for consecutive conditional reestablishment is configured. For example, the UE 701 may increment the value of the counter by "1." In some examples, the UE 701 may further increment the value of the counter in response to additional reestablishment procedures, if any.

To perform the consecutive reestablishment procedure, the UE 701 may try to perform a reestablishment procedure. For example, when a candidate cell (e.g., candidate cell C)

of the set of candidate cells satisfies a configured threshold, the UE 701 may select the candidate cell C as the target cell and perform a reestablishment procedure with this new target cell. In some embodiments of the present application, when the previous failed target cell is included in the set of candidate cells, the UE 701 may not select this failed cell as the new target cell.

Similar to the reestablishment procedure as described above, the UE 701 may transmit a reestablishment request message to the candidate cell C. The UE 701 may start a timer (e.g., T301) associated with the reestablishment request message in response to the transmission of the reestablishment request message. The UE 701 may determine that this reestablishment procedure fails in response to the expiry of the timer T301.

In response to the reestablishment procedure success, the UE 701 may stop the timer for consecutive conditional reestablishment when the time for consecutive conditional reestablishment is configured. The UE 701 may switch to an idle mode in response to the expiry of the timer for consecutive conditional reestablishment.

In response to the reestablishment procedure success, the UE 701 may reset the counter for consecutive conditional reestablishment when the maximum number for consecutive conditional reestablishment is configured. For example, the UE 701 may reset the value of the counter as "0." The UE 701 may switch to an idle mode in response to the value of the counter being greater than the maximum number for consecutive conditional reestablishment.

In some embodiments of the present application, when the value of the timer for consecutive conditional reestablishment and the maximum number for consecutive conditional reestablishment are configured, the UE 701 may switch to an idle mode in response to either the expiry of the timer for consecutive conditional reestablishment or the value of the counter being greater than the maximum number for consecutive conditional reestablishment.

In response to the reestablishment procedure fail, when the UE 701 determines that the timer for consecutive conditional reestablishment (if configured) has not expired or the value of the counter being less than the maximum number for consecutive conditional reestablishment (if configured), the UE 701 may not switch to an idle mode, and may perform another reestablishment procedure. The UE 701 may further increment the value of the counter (e.g., by "1") in response to the another reestablishment procedure.

Although the above descriptions show that the UE 701 performs a consecutive reestablishment procedure in response to a failure of a normal reestablishment procedure (e.g., occurs in response to a RLF), it is contemplated that a UE may perform a consecutive reestablishment procedure in response to a RLF or a conditional reestablishment failure when the UE is configured with consecutive reestablishment. In some embodiments of the present application, the UE may determine the conditional reestablishment failure in response to the expiry of a timer (e.g., T301) associated with reestablishment request transmission.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
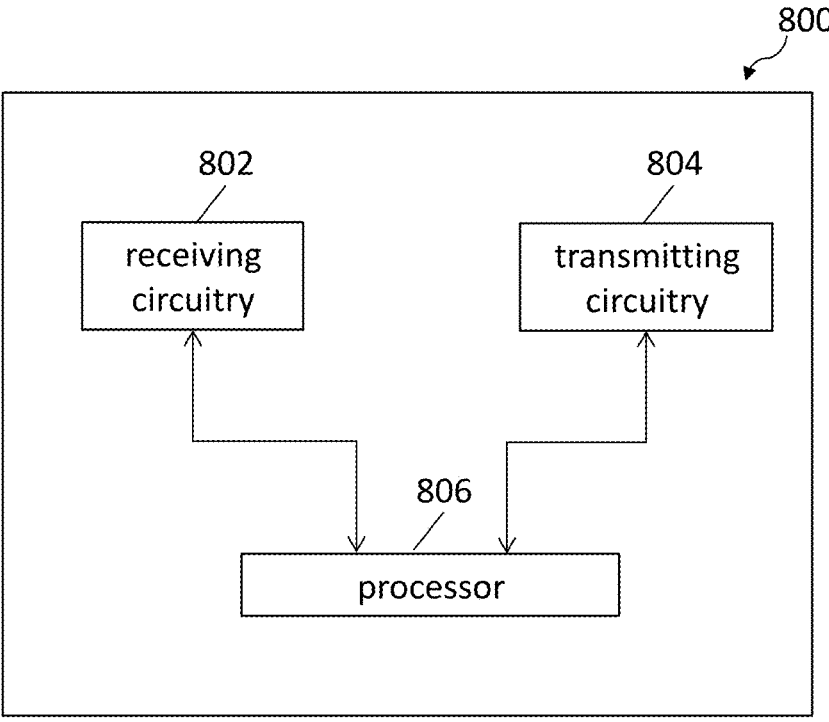
FIG. 8 illustrates a block diagram of an exemplary apparatus according to some embodiments of the present disclosure.

FIG. 8 illustrates a block diagram of an exemplary apparatus 800 according to some embodiments of the present disclosure.

As shown in FIG. 8, the apparatus 800 may include at least one non-transitory computer-readable medium (not illustrated in FIG. 8), at least one receiving circuitry 802, at least one transmitting circuitry 804, and at least one processor 806 coupled to the non-transitory computer-readable medium (not illustrated in FIG. 8), the receiving circuitry 802 and the transmitting circuitry 804. The apparatus 800 may be a base station side apparatus (e.g., a BS or a satellite) or a communication device (e.g., a UE).

Although in this figure, elements such as the at least one processor 806, transmitting circuitry 804, and receiving circuitry 802 are described in the singular, the plural is contemplated unless a limitation to the singular is explicitly stated. In some embodiments of the present disclosure, the receiving circuitry 802 and the transmitting circuitry 804 are combined into a single device, such as a transceiver. In certain embodiments of the present disclosure, the apparatus 800 may further include an input device, a memory, and/or other components.

In some embodiments of the present disclosure, the non-transitory computer-readable medium may have stored thereon computer-executable instructions to cause a processor to implement the method with respect to the UE as described above. For example, the computer-executable instructions, when executed, cause the processor 806 interacting with receiving circuitry 802 and transmitting circuitry 804, so as to perform the operations with respect to the UE depicted in FIGS. 1-7.

In some embodiments of the present disclosure, the non-transitory computer-readable medium may have stored thereon computer-executable instructions to cause a processor to implement the method with respect to the BS or the satellite as described above. For example, the computer-executable instructions, when executed, cause the processor 806 interacting with receiving circuitry 802 and transmitting circuitry 804, so as to perform the operations with respect to the BS or the satellite depicted in FIGS. 1-7.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A user equipment (UE) for wireless communication, comprising:
at least one memory; and
at least one processor coupled with the at least one memory and configured to cause the apparatus to:
receive, at a user equipment (UE), conditional reestablishment configuration information indicating a set of execution conditions for a set of candidate cells, wherein each candidate cell of the set of candidate cells is associated with at least one execution condition; and
trigger, by the UE, a conditional reestablishment procedure before an occurrence of a radio link failure (RLF), by:
evaluating the set of execution conditions based on the conditional reestablishment configuration information in response to the reception of conditional reestablishment configuration information;
selecting a target cell from the set of candidate cells for conditional reestablishment based on the evaluation, and
initiating the conditional reestablishment procedure with the target cell without starting a timer associated with reestablishment initiation.

2. The UE of claim 1, wherein the set of execution conditions includes at least one of the following:
a first execution condition that a first channel quality between the UE and a corresponding candidate cell is an offset better than a second channel quality between the UE and a serving cell of the UE, the second channel quality is less than a first threshold, and the first channel quality is greater than a second threshold;
a second execution condition that a distance between the UE and the serving cell of the UE is greater than a third threshold and a distance between the UE and a corresponding candidate cell is less than a fourth threshold;
a third execution condition indicating an absolute time for performing conditional reestablishment;
a fourth execution condition indicating a value of a timer;
a fifth execution condition that the timing advance value from the UE to a corresponding candidate cell is less than a fifth threshold; and
a sixth execution condition that the timing advance value from the UE to a corresponding candidate cell is less than a sixth threshold and the timing advance value from the UE to the serving cell of the UE is greater than a seventh threshold;
a seventh execution condition that the elevation angle of the serving cell of the UE is less than an eighth threshold, and the elevation angle of a corresponding candidate cell is greater than a ninth threshold.

3. The UE of claim 2, wherein the serving cell of the UE is a primary cell (PCell).

4. The UE of claim 2, wherein the timer starts at the same time as a physical layer timer starts, and the fourth execution condition is fulfilled in response to the expiry of the timer.

5. The UE of claim 2, wherein the first, second, fifth, sixth, or seventh condition is fulfilled when the first, second, fifth, sixth, or seventh condition is satisfied during a timer to trigger (TTT) period.

6. The UE of claim 1, wherein the at least one processor is further configured to cause the UE to:

transmit capability information of the UE, wherein the capability information indicates that the UE supports at least one of the following execution conditions:

a measurement-based condition;

a distance-based condition;

a time-based condition;

a timer-based condition;

a timing advance-based condition; and an elevation angle-based condition.

7. The UE of claim 1, wherein the set of candidate cells includes a first candidate cell associated with at least two execution conditions.

8. The UE of claim 1, wherein the conditional reestablishment configuration information is received in a radio resource control (RRC) message, and the set of candidate cells includes more than one candidate cell.

9. The UE of claim 1, wherein the at least one processor is further configured to cause the UE to:

determine that more than one candidate cell satisfies a reestablishment condition; and select a target cell for conditional reestablishment from the more than one candidate cell.

10. The UE of claim 1, wherein the at least one processor is further configured to cause the UE to:

initiating a reestablishment procedure in response to a radio link failure (RLF);

select a target cell for performing reestablishment; and transmit a reestablishment request message to the target cell.

11. An apparatus for wireless communication, comprising:

at least one memory; and at least one processor coupled with the at least one memory and configured to cause the apparatus to:

transmit, to a user equipment (UE), conditional reestablishment configuration information indicating a set of execution conditions for a set of candidate cells, wherein each candidate cell of the set of candidate cells is associated with at least one execution condition, and wherein the conditional reestablishment configuration information is associated with triggering, by the UE, a conditional reestablishment procedure before an occurrence of a radio link failure (RLF) at the UE using a target cell selected, before the occurrence of the RLF, from the set of candidate cells and without starting a timer associated with reestablishment initiation.

12. The apparatus of claim 11, wherein the set of execution conditions includes at least one of the following:

a first execution condition that a first channel quality between the UE and a corresponding candidate cell is an offset better than a second channel quality between the UE and a serving cell of the UE, the second channel quality is less than a first threshold, and the first channel quality is greater than a second threshold;

a second execution condition that a distance between the UE and the serving cell of the UE is greater than a third threshold and a distance between the UE and a corresponding candidate cell is less than a fourth threshold;

a third execution condition indicating an absolute time for performing conditional reestablishment;

a fourth execution condition indicating a value of a timer;

a fifth execution condition that the timing advance value from the UE to a corresponding candidate cell is less than a fifth threshold;

a sixth execution condition that the timing advance value from the UE to a corresponding candidate cell is less than a sixth threshold and the timing advance value from the UE to the serving cell of the UE is greater than a seventh threshold; and a seventh execution condition that the elevation angle of the serving cell of the UE is less than an eighth threshold, and the elevation angle of a corresponding candidate cell is greater than a ninth threshold.

13. The apparatus of claim 11, wherein the at least one processor is further configured to cause the apparatus to:

receive capability information of the UE, wherein the capability information indicates that the UE supports at least one of the following execution conditions:

a measurement-based condition;

a distance-based condition;

a time-based condition;

a timer-based condition;

a timing advance-based condition; and an elevation angle-based condition.

14. The apparatus of claim 11, wherein the set of candidate cells includes a first candidate cell associated with at least two execution conditions.

15. The apparatus of claim 11, wherein the conditional reestablishment configuration information is transmitted in a radio resource control (RRC) message, and the set of candidate cells includes more than one candidate cell.

16. The apparatus of claim 11, wherein the at least one processor is further configured to cause the apparatus to:

transmit a message including a UE context of the UE to at least one of the set of candidate cells.

17. The apparatus of claim 16, wherein the message indicates a value of a timer associated a validity period of the UE context.

18. A method performed by a user equipment (UE), the method comprising:

receiving conditional reestablishment configuration information indicating a set of execution conditions for a set of candidate cells, wherein each candidate cell of the set of candidate cells is associated with at least one execution condition; and triggering a conditional reestablishment procedure before an occurrence of a radio link failure (RLF), by:

evaluating the set of execution conditions based on the conditional reestablishment configuration information in response to the reception of conditional reestablishment configuration information;

selecting a target cell from the set of candidate cells for conditional reestablishment based on the evaluation, and initiating the conditional reestablishment procedure with the target cell without starting a timer associated with reestablishment initiation.

19. The method of claim 18, wherein the set of execution conditions includes at least one of the following:

a first execution condition that a first channel quality between the UE and a corresponding candidate cell is an offset better than a second channel quality between the UE and a serving cell of the UE, the second channel quality is less than a first threshold, and the first channel quality is greater than a second threshold;

a second execution condition that a distance between the UE and the serving cell of the UE is greater than a third threshold and a distance between the UE and a corresponding candidate cell is less than a fourth threshold;

a third execution condition indicating an absolute time for performing conditional reestablishment;

a fourth execution condition indicating a value of a timer;

a fifth execution condition that the timing advance value from the UE to a corresponding candidate cell is less than a fifth threshold; and a sixth execution condition that the timing advance value from the UE to a corresponding candidate cell is less than a sixth threshold and the timing advance value from the UE to the serving cell of the UE is greater than a seventh threshold;

a seventh execution condition that the elevation angle of the serving cell of the UE is less than an eighth threshold, and the elevation angle of a corresponding candidate cell is greater than a ninth threshold.

* * * * *